United States Patent
Yang et al.

(10) Patent No.: US 9,570,999 B2
(45) Date of Patent: Feb. 14, 2017

(54) DC-DC CONVERTER AND DC-DC CONVERTER SYSTEM THEREOF

(71) Applicant: DELTA ELECTRONICS (SHANGHAI) CO., LTD., Shanghai (CN)

(72) Inventors: Zhongwang Yang, Shanghai (CN); Qiong Zhang, Shanghai (CN); Guisong Huang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 37 days.

(21) Appl. No.: 14/610,397

(22) Filed: Jan. 30, 2015

(65) Prior Publication Data
US 2015/0249391 A1    Sep. 3, 2015

(30) Foreign Application Priority Data
Feb. 28, 2014 (CN) .......................... 2014 1 0073023

(51) Int. Cl.
*H02M 3/335* (2006.01)
*H02M 3/157* (2006.01)
(Continued)

(52) U.S. Cl.
CPC ......... *H02M 3/33576* (2013.01); *H02M 3/335* (2013.01); *H02M 3/156* (2013.01);
(Continued)

(58) Field of Classification Search
CPC ............... H02M 2001/0009; H02M 2001/008; H02M 2001/327; H02M 3/156; H02M 3/157; H02M 3/335
See application file for complete search history.

(56) References Cited

U.S. PATENT DOCUMENTS 5,790,005 A * 8/1998 Santi .................. H01F 3/14
                                                    335/296
6,215,290 B1    4/2001 Yang et al.
(Continued)

FOREIGN PATENT DOCUMENTS

| CN | 102624230 | 8/2012 |
|---|---|---|
| CN | 102983563 | 3/2013 |
| TW | 201227203 | 7/2012 |

OTHER PUBLICATIONS

Office Action dated Dec. 3, 2015 from corresponding No. CN 201410073023.5.

*Primary Examiner* — Fred E Finch, III
*Assistant Examiner* — Rafael O De Leon Domenech
(74) *Attorney, Agent, or Firm* — Yunling Ren

(57) ABSTRACT

The present disclosure discloses a DC-DC converter and a DC-DC converter system thereof. The DC-DC converter includes: a power conversion circuit; and a current detection circuit for detecting current flowing into or flowing out of the power conversion circuit, which includes: an inductor coupled to the power conversion circuit; a detection module including an induction winding and an impedance component electrically connected in series, the detection module and the inductor being connected in parallel; and an output module coupled to two ends of the impedance component for generating a current detection signal reflecting the current flowing into or flowing out of the power conversion circuit.

27 Claims, 7 Drawing Sheets

(51) Int. Cl.
   *H02M 1/32*  (2007.01)
   *H02M 3/156*  (2006.01)
   *H02M 1/00*  (2006.01)

(52) U.S. Cl.
   CPC .... *H02M 3/157* (2013.01); *H02M 2001/0009* (2013.01); *H02M 2001/327* (2013.01)

(56) References Cited

U.S. PATENT DOCUMENTS

| | | | |
|---|---|---|---|
| 6,356,461 B1 * | 3/2002 | Jacobs | H02M 3/337 363/132 |
| 2009/0009137 A1 * | 1/2009 | Zhang | H02J 1/00 320/137 |
| 2009/0146643 A1 | 6/2009 | Ostrom et al. | |
| 2010/0109648 A1 * | 5/2010 | Cheung | G01R 15/181 324/126 |
| 2013/0119962 A1 * | 5/2013 | Holmberg | H02J 1/00 323/304 |
| 2013/0300392 A1 * | 11/2013 | Laur | H02M 3/156 323/284 |

* cited by examiner

DC-DC CONVERTER AND DC-DC CONVERTER SYSTEM THEREOF

CROSS-REFERENCE TO RELATED APPLICATIONS

This application claims priority under 35 U.S.C. §119 to Chinese Patent Application No. 201410073023.5, filed on Feb. 28, 2014, the entire contents of which are incorporated herein by reference.

TECHNICAL FIELD

The present disclosure relates to the technical field of power supply and, more particularly, to a DC-DC (Direct Current-Direct Current) converter and a DC-DC converter system thereof.

BACKGROUND

In the power supply system, the current detection technology is widely applied to achieve the functions such as current control, current protection, parallel current sharing and current monitoring, so it is very important to obtain a precise current detection result. FIG. 1 is a schematic diagram of a current detection circuit in the related art. As shown in FIG. 1, the current detection circuit 12 includes an output inductor L, a sampling resistor R and a differential amplifier 122. The output inductor L and the sampling resistor R are respectively coupled to a positive pole 13 and a negative pole 14 of the power conversion circuit 11, and the power conversion circuit 11 also has an input voltage Vin and an output voltage $V_O$. Input terminals of the differential amplifier 122 are connected in parallel to two ends of the resistor R so as to amplify a current signal at the two ends of the sampling resistor R to obtain a current detection signal. In particular, through measuring the voltage at the two ends of the sampling resistor R and using the formula I=V/R, the magnitude of the current signal at the two ends of the sampling resistor R can be obtained, and thus the magnitude of the current detection signal may be obtained.

Due to sampling current by a sampling resistor with high precise, in the above method, the sampled values are relatively stable since the resistor having low temperature coefficient can be selected to avoid the effects of the temperature drift. However, this method has the following deficiencies: the loss of the sampling resistor is large when the current flowing through the sampling resistor is relatively large, and the heat dissipation and the occupied volume should also be considered during the design process of the circuit.

FIG. 2 is a schematic circuit diagram of another DC-DC converter in the related art. As shown in FIG. 2, the current detection circuit 12 includes an output inductor 121, a sampling resistor R, a sampling capacitor C and a differential amplifier 122. The output inductor 121 includes an inductor L and an equivalent series resistor $R_1$ of the inductor. A sampling resistor R and a sampling capacitor C are connected in series, and then connected to the output inductor 121 in parallel. Input terminals of the differential amplifier 122 are connected in parallel to two ends of the capacitor C. The output inductor 121, the sampling resistor R and the sampling capacitor C are connected to an output side of the power conversion circuit 11, and the power conversion circuit 11 also has an input voltage Vin (the input terminals are marked as 13 and 14, respectively) and an output voltage $V_O$.

As shown in FIG. 2, if the current flowing through the inductor L is $i_L$, the current flowing through the capacitor C is $i_C$, the voltage at two ends of the inductor L is $v_L$ and the voltage on the capacitor C is $v_C$, the following equation (1) is obtained: $v_L + i_L R_1 = v_C + i_C R$. The following equation (2) is obtained by averaging the equation (1) in one switching cycle: $V_L + I_L R_1 = V_C + I_C R$. In the equation (2), $V_L$ is an average value of the voltage on the inductor in one switching cycle, and obviously $V_L = 0$; $V_O$ is an average value of the output voltage; $I_L$ is an average value of the current of the inductor and equal to a load current $I_O$; $i_C$ is an average value of the charging and discharging current of the capacitor in one switching cycle, and obviously $I_C = 0$; and $R_1$ is an ESR (equivalent series resistance) of the inductor.

Thus, the equation (2) may be transformed into an equation (3): $I_L R_1 = V_C$. That is, the following equation (4) is obtained: $I_L = I_O = V_C / R_1$.

Therefore, it is enough for detecting the magnitude of the load current and the current of the inductor to detect the magnitude of the voltage on the capacitor. Such method may sample the current conveniently, easily and without loss.

However, this method also has the following defects: in the current detection circuit, relatively large capacitor and resistor are needed to filter the pulses flowing through the inductor L, and thus the time constant $\tau = R \times C$ of the RC loop increases, the charging and discharging time becomes longer, so that it is impossible to respond to the variation of the current on the inductor L rapidly.

The above information disclosed in the part of Background is only used to enhance the understanding to the background of the present disclosure, and thus may include the information which is not the related art known by the person skilled in the art.

SUMMARY

Therefore, one objective of the present disclosure is to provide a DC-DC converter having the function of detecting the current of the inductor with high precise. Another objective of the present disclosure is to provide a DC-DC converter system including a plurality of DC-DC converters connected in parallel.

Other objectives, features and advantages of the present disclosure will become apparent from the following detailed depiction, or can be learned in part by practicing the present disclosure.

According to an embodiment of the present disclosure, a DC-DC converter is provided, which may include: a power conversion circuit; and a current detection circuit configured to detect current flowing into or flowing out of the power conversion circuit, the current detection circuit includes: an inductor coupled to the power conversion circuit; a detection module including an induction winding and an impedance component which are electrically connected in series, the detection module and the inductor are connected in parallel; and an output module coupled to two ends of the impedance component and configured to generate a current detection signal reflecting the current flowing into or flowing out of the power conversion circuit.

According to another embodiment of the present disclosure, a DC-DC converter system is provided, which may include: a plurality of parallel DC-DC converters, each DC-DC converter may include: power conversion circuit; and a current detection circuit configured to detect current flowing into or flowing out of the power conversion circuit, the current detection circuit includes: an inductor coupled to the power conversion circuit; a detection module including an induction winding and an impedance component which are electrically connected in series, the detection module and the inductor are connected in parallel; and an output module coupled to two ends of the impedance component and configured to generate a current detection signal reflecting the current flowing into or flowing out of the power conversion circuit; and a non-isolated switch regulator electronically coupled to an output terminal of the DC-DC converter and configured to convert an output voltage of the DC-DC converter to one or more regulated voltage.

BRIEF DESCRIPTION OF THE DRAWINGS

For the person skilled in the art, the above and other features and advantages of the present disclosure will become more apparent through reading the detailed depiction to the exemplary embodiments shown in respective drawings.

DETAILED DESCRIPTION

Figure 1:
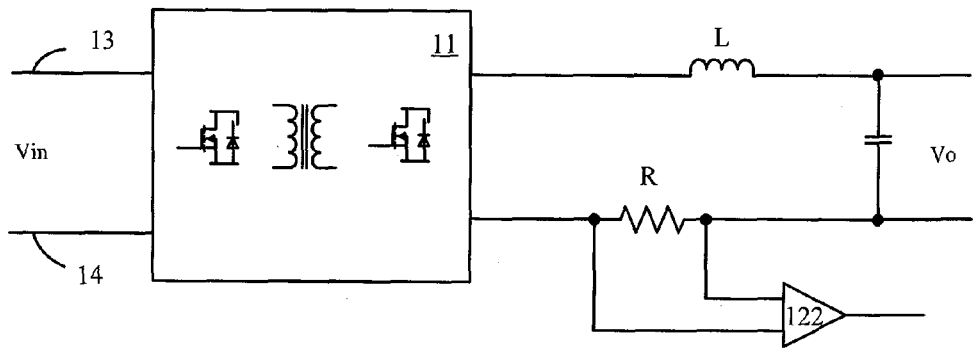
FIG. 1 is a schematic circuit diagram of a DC-DC converter in the related art.

Now the embodiments will be described more completely with reference to the drawings. However, the embodiments can be implemented in various forms, and shall not be interpreted to be limited to the embodiments explained herein. On the contrary, these embodiments are provided for making the present disclosure to be complete and intact, and for delivering the concept of the embodiments to the person skilled in the art completely. In the drawings, for clarity, thicknesses of areas and layers are exaggerated. In the drawings, the same reference signs indicate the same or similar parts, and thus the repeated depiction of them could be omitted.

In addition, the described features, structures or characters may be combined in one or more embodiments in any appropriate manner. In the following depiction, many specific details are provided for sufficient understanding to the embodiments of the present disclosure. However, the person skilled in the art could appreciate that the technical solutions of the present disclosure could be practiced without one or more element in the specific details, or by adopting other methods, components, materials and the like. In other conditions, the known structures, materials or operations are not illustrated or described in detail for avoiding blurring respective aspects of the present disclosure.

The typical embodiments embodying the features and advantages of the present disclosure will be explained particularly in the following description. It should be understood that the present disclosure could have all kinds of variations in different embodiments, which are not depart from the scope of the present disclosure, and the description and drawings thereof are used for explanation, but not for limiting the present disclosure.

Figure 3A:
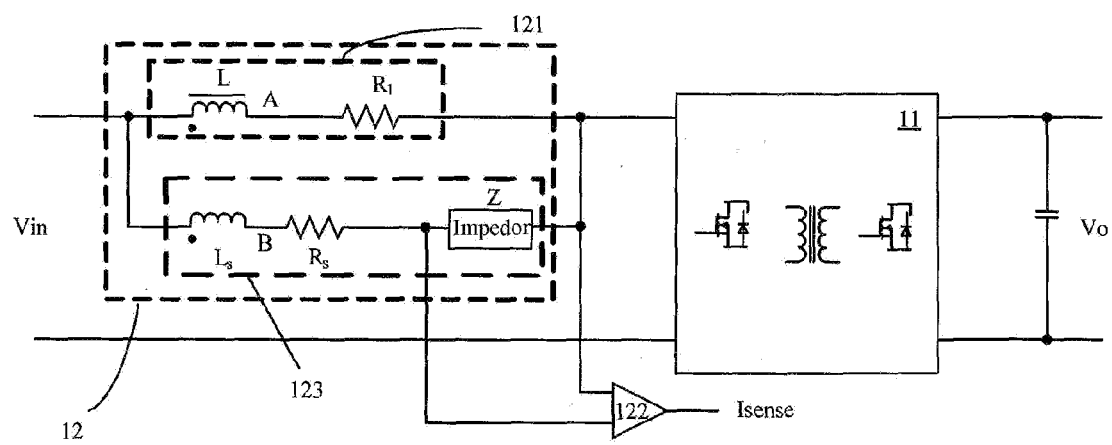
FIG. 3A is a schematic circuit diagram of a DC-DC converter according to an exemplary embodiment of the present disclosure.
Figure 3B:
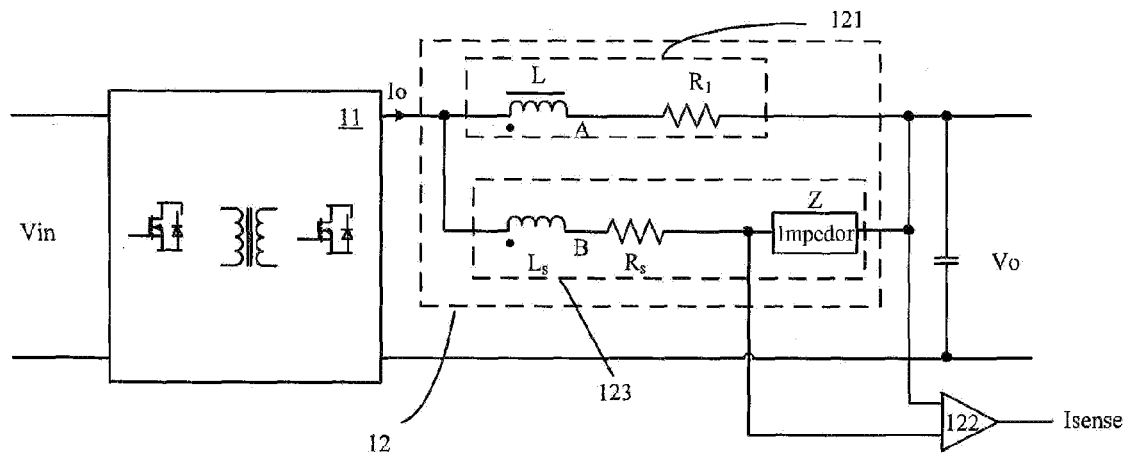
FIG. 3B is a schematic circuit diagram of another DC-DC converter according to an exemplary embodiment of the present disclosure.

FIG. 3A and FIG. 3B are schematic diagrams of DC-DC converters respectively for detecting an input current and an output current according to exemplary embodiments of the present disclosure. The DC-DC converter includes a power conversion circuit 11 and a current detection circuit 12. For example, the power conversion circuit 11 is an isolated DC-DC conversion circuit.

As shown in FIG. 3A, the current detection circuit 12 is provided at a primary side of the power conversion circuit 11 and is configured to detect a current flowing into the power conversion circuit 11. Input terminals of the DC-DC converter are configured to receive an input voltage Vin. Output terminals of the DC-DC converter are configured to provide an output voltage Vo.

As shown in FIG. 3B, the current detection circuit 12 is provided at a secondary side of the power conversion circuit 11 and is configured to detect a current flowing out of the power conversion circuit 11. The input terminals of the DC-DC converter are configured to receive an input voltage Vin. The output terminals of the DC-DC converter are configured to provide an output voltage $V_O$.

As shown in FIG. 3A and FIG. 3B, the current detection circuit 12 includes an inductor 121, a detection module 123 and an output module 122.

The inductor 121 is coupled to the power conversion circuit 11, and is consisted of an inductor L and an equivalent internal resistor $R_1$. The detection module 123 is electrically connected to the inductor 121 in parallel. The detection module 123 includes an induction winding 145 and an impedance component Z which are electrically connected in series, and the induction winding 145 has an inductor Ls and an internal resistor $R_S$.

Figure 4A:
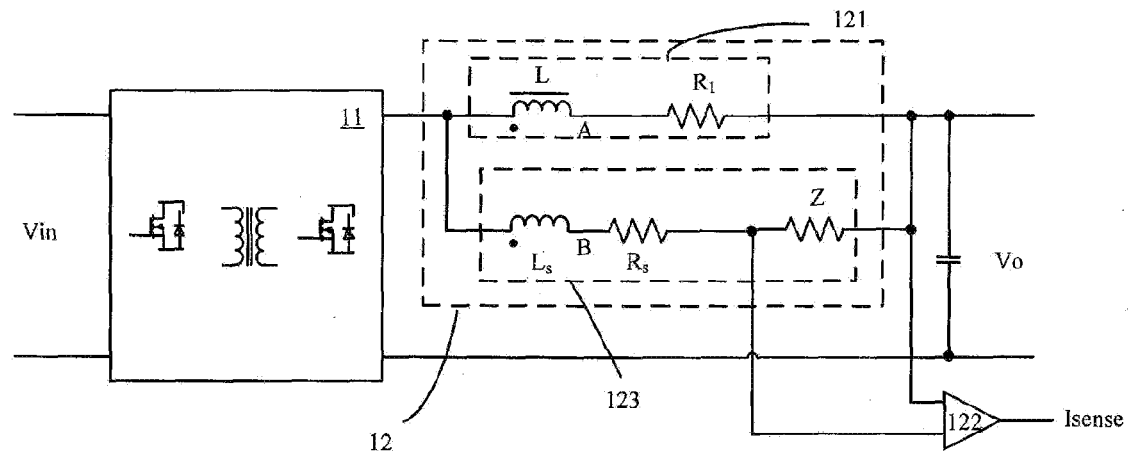
FIG. 4A is a schematic circuit diagram of a circuit detection circuit in a high-efficiency converter according to an exemplary embodiment of the present disclosure.
Figure 4B:
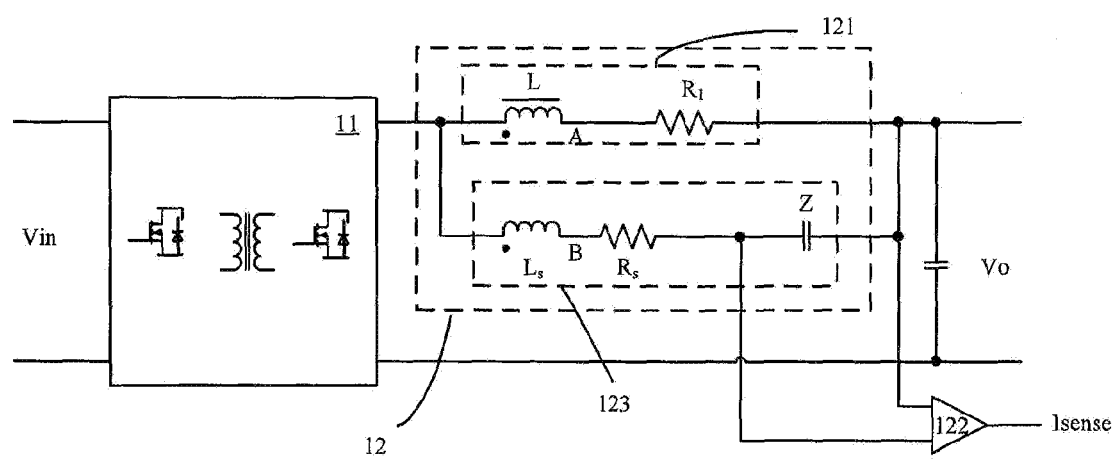
FIG. 4B is a schematic circuit diagram of a circuit detection circuit in a high-efficiency converter according to an exemplary embodiment of the present disclosure.

In one embodiment, the impedance component Z may be a resistor (see FIG. 4A). In other embodiment, the impedance component Z may be a capacitor (see FIG. 4B).

The output module 122 is coupled to two ends of the impedance component Z for generating a current detection signal $I_{sense}$ reflecting a current flowing into or flowing out of the power conversion circuit 11. In one embodiment of the present disclosure, the output module 122 may be a differential amplifier 122, but the present disclosure is not limited thereto.

The current detection circuit 12 detects an output current $I_O$ flowing out of the power conversion circuit 11. When the output current Io flows through the inductor 121, a voltage which is proportional to the output current Io will be generated on an equivalent internal resistor $R_1$ of the inductor 121. However, since the equivalent internal resistor $R_1$ is distributed in the inductor 121, it is impossible to detect the magnitude of the voltage directly. The current detection circuit 12 detects this voltage by utilizing the induction winding 145 and the impedance component Z as well as the differential amplifier 122, so as to get the value of the output current $I_O$.

Figure 5:
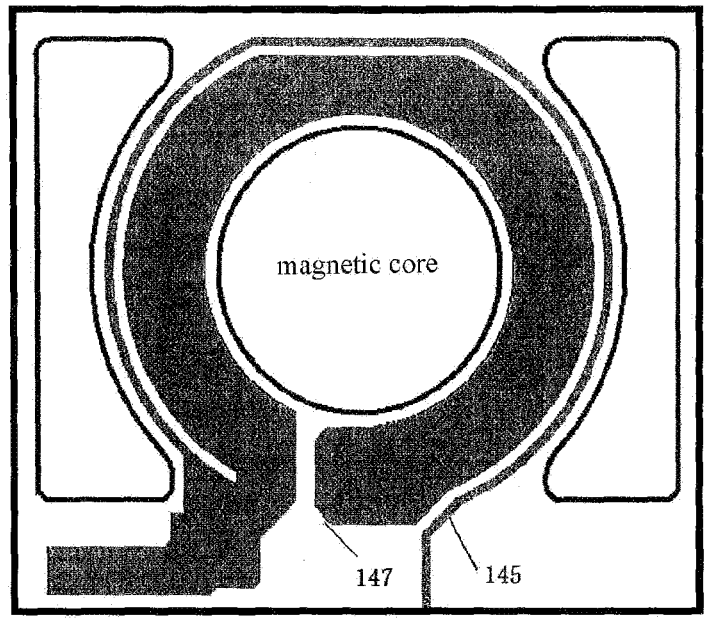
FIG. 5 is a schematic diagram of an inductor and an induction winding in a DC-DC converter according to an exemplary embodiment of the present disclosure.

FIG. 5 is a schematic diagram of an inductor and an induction winding in a DC-DC converter according to an exemplary embodiment of the present disclosure. Referring to FIG. 5, a fully-coupled induction winding 145 is winded on a magnetic core of the inductor 121, and the number of turns and the winding direction of the induction winding 145 are the same with those of a winding 147 of the inductor 121, so as to induce the exact same voltage on the inductor Ls and the inductor L. For example, the induction winding 145 and the winding 147 of the inductor 121 may be located at the same PCB layer, and close to each other as possible as they can so as to reduce the leakage inductance. In addition, the induction winding 145 and the inductor 121 may be located at different layers (e.g., the adjacent two layers) of the PCB respectively, and the projections of the induction winding 145 and the winding 147 of the inductor 121 are overlapped so as to reduce the leakage inductance. Since the exact same voltage is induced on the inductor Ls and the inductor L, a potential of point A is equal to a potential of point B.

Thus, a voltage across the impedance component Z is equal to a voltage difference between a voltage across the resistor R1 and a voltage across the resistor Rs. Since the resistor Rs is an ESR (equivalent series resistor) of the inductor Ls, a resistance value thereof is of milliohm level; and when the impedance component Z is an external resistor, the resistance value thereof is of ohm level; the voltage across the resistor Rs may be ignored in comparison to the resistance value of the resistor R1 with the resistance value of the resistor Rs. That is, the voltage between the two ends of the resistor R1 is substantially equal to the voltage between the two ends of the resistor Z. When the impedance component Z is a capacitor, the voltage value between the two ends of the resistor Rs is zero, i.e., the voltage between the two ends of the resistor R1 is equal to the voltage between the two ends of the capacitor Z.

Furthermore, the resistors R1 and Rs are respectively the ESR (equivalent series resistances) of the inductors L and Ls, and the resistance values thereof are of milliohm level; therefore, the current flowing through the internal resistor R1 is much larger than the current flowing through the internal resistor Rs and the impedance component Z, and is approximately equal to the output current To of the circuit, according to the shunting principle of the parallel circuit. Therefore, the sampling to the output current To may be achieved by measuring the voltage between the two ends of the resistor R1. Moreover, the voltage between the two ends of the resistor R1 is equal to the voltage between the two ends of the impedance component Z as derived above. Thus, the sampling to the output current may also be achieved by measuring the voltage between the two ends of the impedance component Z.

Figure 2:
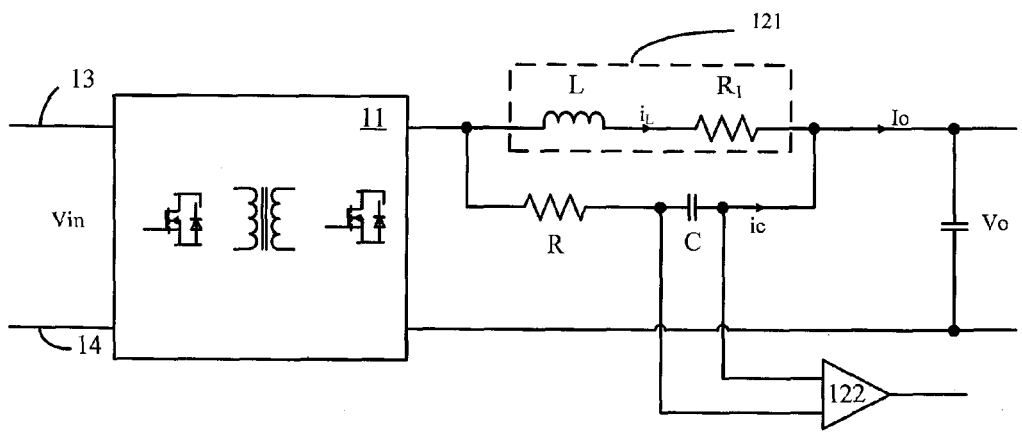
FIG. 2 is a schematic circuit diagram of another DC-DC converter in the related art.

Since the impedance component Z is an input impedance of the differential amplifier 122, the smaller the Z is, the better the anti-interference ability of the detection circuit may be obtained, such that the detection noise is decreased. However, if the impedance component Z is too small, the accuracy of the current detection may be affected, since both of the resistors R1 and Rs are the parameters which are not easy to be controlled. Only when the impedance component Z is far larger than the resistors R1 and Rs, the favorable precision of the detection can be ensured. Compared with the related art shown in FIG. 2, in the current detection circuit of the DC-DC converter according to the embodiments of the present disclosure, the inductor Ls immediately induces the exact same voltage as that of the inductor L, thus the present disclosure has the advantage of no delay, and may not generate a large sampling resistance loss as that generated in the related art shown in FIG. 1. In addition, the problem of heat dissipation and the occupied volume should also be considered during the design process of the circuit in FIG. 1. By contrast, the current detection circuit has the advantage of no loss.

Figure 6:
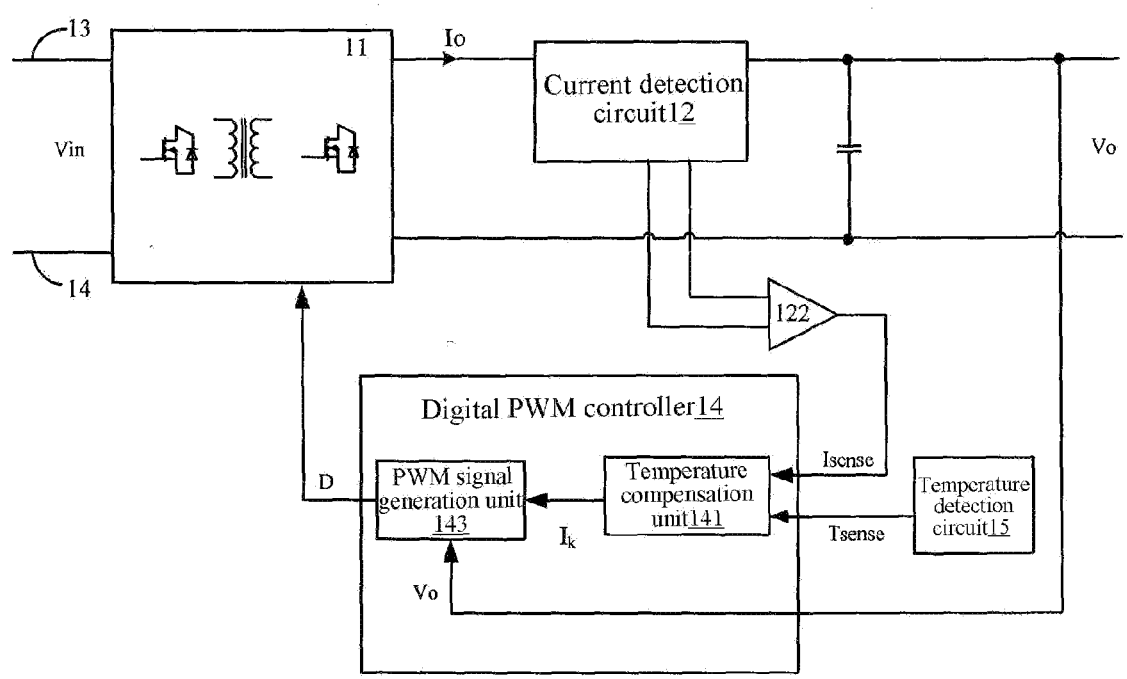
FIG. 6 is a schematic circuit block diagram of a DC-DC converter according to an exemplary embodiment of the present disclosure.

FIG. 6 is a schematic circuit block diagram of a DC-DC converter according to another exemplary embodiment of the present disclosure. The DC-DC converter in another exemplary embodiment of the present disclosure shown in FIG. 6 has the similar structure with the DC-DC converter in any one exemplary embodiment of the present disclosure shown in each of FIGS. 3A, 3B, 4A and 4B. The difference lies in that the DC-DC converter in FIG. 6 further includes a temperature detection circuit 15 and a digital PWM controller 14 in addition to the current detection circuit 12. The person skilled in the art should be appreciated that in some other embodiments, the DC-DC converter may only include a temperature detection circuit and a temperature compensation unit for temperature compensation or correction of the current detection signal output from the current detection circuit, so as to output a corrected current detection signal, which is also within the spirit and scope of the present disclosure.

The temperature detection circuit 15 is configured to detect a temperature of the inductor 121 and output a temperature detection signal $T_{sense}$. According to an embodiment of the present disclosure, the temperature detection circuit 15 may be a temperature sensor, but the present disclosure is not limited thereto.

The digital PWM controller 14 is electrically coupled to the power conversion circuit 11, the current detection circuit 12 and the temperature detection circuit 15. The digital PWM controller 14 is configured to receive the current detection signal $I_{sense}$, the temperature detection signal $T_{sense}$, and the output voltage Vo of the DC-DC converter, and then outputs a PWM driving signal D for controlling the power conversion circuit 11. The power conversion circuit 11 regulates the output voltage Vo according to the PWM driving signal D so as to keep the output voltage Vo constant substantially.

In one embodiment, the digital PWM controller 14 includes a temperature compensation unit 141 and a PWM signal generation unit 143. The temperature compensation unit 141 receives the current detection signal $I_{sense}$, and the temperature detection signal $T_{sense}$, and outputs the corrected current detection signal $I_k$. The PWM signal generation unit 143 is coupled to the temperature compensation unit 141, and generates the PWM driving signal D on the basis of the corrected current detection signal $I_k$ and the output voltage Vo of the DC-DC converter.

Since the digital PWM controller 14 needs to use the corrected current detection signal $I_k$ which is irrelevant to the temperature, the corrected current detection signal $I_k$ should immediately reflect the practical value of the current output from the power conversion circuit 11. Meanwhile, in order to obtain a high control accuracy, the current signal $I_{sense}$ needs a temperature compensation so as to compensate the current detection error due to the temperature effects.

In the digitally controlled power supply, the temperature compensation may be achieved by analog-to-digital (A/D) conversion and software operation of the current signal. However, this procedure needs much time and thus cannot satisfy the requirement of rapid response to the output current; an improvement solution is to adopt the hardware units in the digital control chip to achieve this procedure. For the temperature signal per se, it changes relatively slow, the temperature compensation function may be achieved by obtaining the temperature signal using pure digital process method and then writing the obtained temperature signal into a register or firmware of the relevant hardware.

Figure 7:
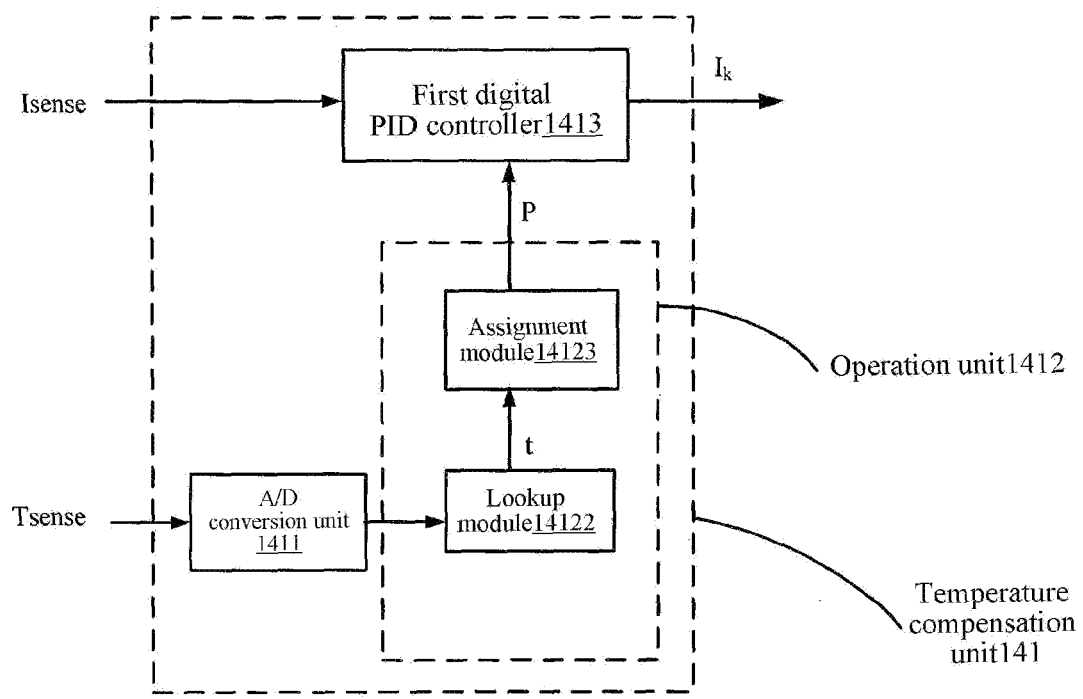
FIG. 7 is a schematic diagram of a temperature compensation unit in a DC-DC converter according to an exemplary embodiment of the present disclosure.

FIG. 7 is a schematic diagram of a temperature compensation unit in the DC-DC converter according to an exemplary embodiment of the present disclosure. As shown in FIG. 7, the temperature compensation unit 141 includes an analog-to-digital (A/D) conversion unit 1411, an operation unit 1412 and a first digital PID controller 1413. The A/D conversion unit 1411 receives the temperature detection signal $T_{sense}$, converts the temperature detection signal $T_{sense}$ into a digital temperature signal and then sends it to the operation unit 1412 for facilitating the operation unit 1412 to perform operations, such as calculation, process, on the temperature detection signal $T_{sense}$. The operation unit 1412 receives the digital temperature signal and processes the digital temperature signal so as to obtain a temperature compensation factor P. The first digital PID controller 1413 receives and processes the temperature compensation factor P and the current detection signal $I_{sense}$ so as to obtain the corrected current detection signal $I_k$.

In one embodiment, the operation unit 1412 includes a lookup module 14122 and an assignment module 14123. The lookup module 14122 contains a lookup table therein storing a relationship between the digital temperature signals and the temperature values, and a corresponding temperature value t may be obtained through the lookup table according to the digital temperature signal. The assignment module 14123 generates the temperature compensation factor P on the basis of a predetermined formula and the temperature value t. The predetermined formula is stored in a register or a firmware of the digital PWM controller. For example, the predetermined formula is: $P=K_p/(1+(t-25)*a)$, wherein $k_p$ is a correction coefficient of the output inductor, t is an actual temperature, a is a temperature coefficient of the copper, and P is the temperature compensation factor. In addition, it should be explained that the temperature detection signal $T_{sense}$ may be a voltage signal which is measured by the temperature detection circuit 15.

The first digital PID controller 1413 is a hardware unit inside the digital control chip. In an embodiment of the present disclosure, the first digital PID controller 1413 may be a digital PID controller, and its parameters P, I and D may be written into the hardware by software programming. When only the parameter P is set, the PID controller is a multiplier indeed, and for a certain parameter P, the output of the PID controller may respond to the input signal quickly.

In detail, the signal $I_{sense}$ is a current detection signal which is obtained by amplifying the actually sampled current signal, $I_{sense}=ESR*(1+(t-25)*a)*Io$, wherein ESR is a resistance value of the equivalent internal resistor $R_1$ of the inductor L, t is an actual temperature, and a is a temperature coefficient of the copper. It can be seen that $I_{sense}$ is relevant to the temperature. In order to obtain an accurate current signal, it is required to eliminate the effects of the temperature on the current signal. Therefore, the function of the temperature compensation unit 141 is actually to remove the factor $(1+(t-25)*a)$ from $I_{sense}$.

$T_{sense}$ is a voltage signal obtained from the temperature sensor, and it is converted into a digital temperature signal by use of A/D conversion. The temperature value t corresponding to this voltage is obtained by the lookup table, and the obtained t is put into the formula $P=k_p/(1+(t-25)a)$ so as to obtain a numerical value P, wherein $k_p$ is a correction coefficient of the output inductance ESR. Every product may be calibrated to obtain a $k_p$ value belonging to a certain product, so as to eliminate the error due to different ESRs among different products. Then, $I_{sense}$ is multiplied by P through the digital PID controller to obtain a corrected current detection signal $I_k$ which is irrelevant to the temperature. Since the temperature coefficient is eliminated, $I_k=k*Io$, the current detection function with high accuracy is achieved, the accuracy of the current detection signal is ensured, and thus the accuracy of the PWM driving signal D generated by the PWM signal generation unit 143 is ensured, therefore the output voltage Vo of the DC-DC converter may be regulated more accurately.

Figure 8:
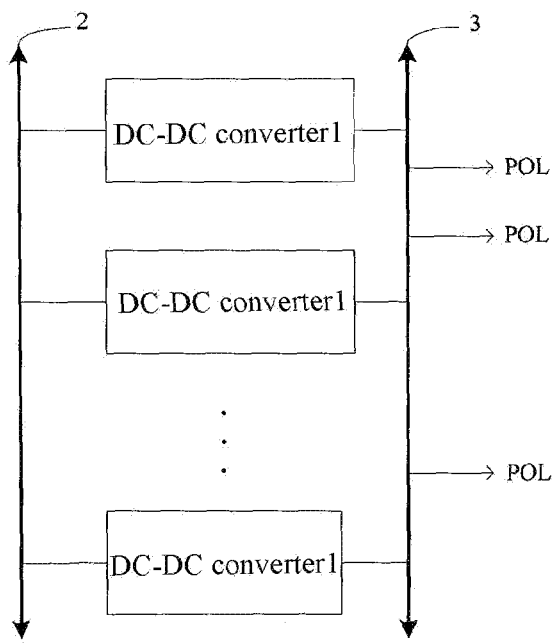
FIG. 8 is a schematic diagram of a DC-DC converter system according to an exemplary embodiment of the present disclosure.

FIG. 8 is a schematic diagram of a DC-DC converter system according to an exemplary embodiment of the present disclosure. As shown in FIG. 8, the DC-DC converter system includes a plurality of parallel DC-DC converters 1, which are arranged in parallel between an input power bus 2 and an output power bus 3, and at least one non-isolated switch regulator POL (Point of Load).

The non-isolated switch regulator POL is electrically coupled to an output terminal of the DC-DC converter 1 for converting the output voltage of the DC-DC converter 1 into one or more regulated voltage. In a general condition, a voltage at the input power bus 2 ("input voltage") is larger than a voltage at the output power bus 3 ("output voltage"). The voltage from the output bus 3 is provided to at least one non-isolated switch regulator POL, and the at least one non-isolated switch regulator POL supplies the power to local loads. The DC-DC converter 1 is the DC-DC converter 1 in any embodiment mentioned above, and the description thereof is not repeated herein.

In addition, when the power required by the electrical/electronic system is larger than the power which could be supplied by one DC-DC converter 1, a plurality of DC-DC converters 1 which are connected in parallel may be used. In such configuration, the output voltages of the DC-DC converters 1 are essentially the same, and are equal to the output voltage occurred on the output bus 3. The DC-DC converters 1 supply the load current in a sharing manner. As one simple example, if there are five of the same DC-DC converters 1 and the load current is 50 amps, it is desirable that each DC-DC converter 1 supplies 10 amps.

It is necessary to provide the current sharing control in the system using the parallel DC-DC converters 1 so as to ensure that the load current and heat may be distributed uniformly and one or more converter are prevented from overload. The DC-DC converters 1 in the present disclosure adopt so-called "droop" method to achieve the purpose of sharing current by respective DC-DC converters 1. The "droop" method is so called because it uses a downward sloping characteristic of the output of the converter which will be explained hereinafter.

Therefore, unlike the DC-DC converters 1 in any embodiment mentioned above, the DC-DC converters 1 in the DC-DC converter system according to the exemplary embodiment of the present disclosure further includes an output voltage droop characteristic controller for achieving current sharing among a plurality of the DC-DC converters 1 so as to ensure that the current stress and heat stress may be distributed uniformly among respective parallel DC-DC converters 1. The output voltage droop characteristic controller generates a control signal for controlling the droop characteristic of the output voltage according to the corrected current detection signal and the output voltage of the DC-DC converter.

The DC-DC converter system in conventional parallel system adopts the voltage droop method to achieve the current sharing among the DC-DC converter, so as to ensure the current stress and heat stress to be distributed uniformly among the parallel DC-DC converters 1. The precise of the voltage droop has important effects on the effect of the parallel current sharing. Meanwhile, in order to avoid the instant unbalance of the current, it is also required that the output droop characteristic has a quick response. That is, when the output current changes, the output voltage shall be regulated immediately so as to make the output current reach a new balance. In the digitally controlled power supply, the output droop characteristic may be obtained through operation of a software, however, since both the digital sampling and the operation of the software take time, general voltage droop methods cannot satisfy the current sharing function with quick response, the present disclosure proposes to utilize the hardware unit inside the digital control chip to achieve the voltage regulation.

Figure 9:
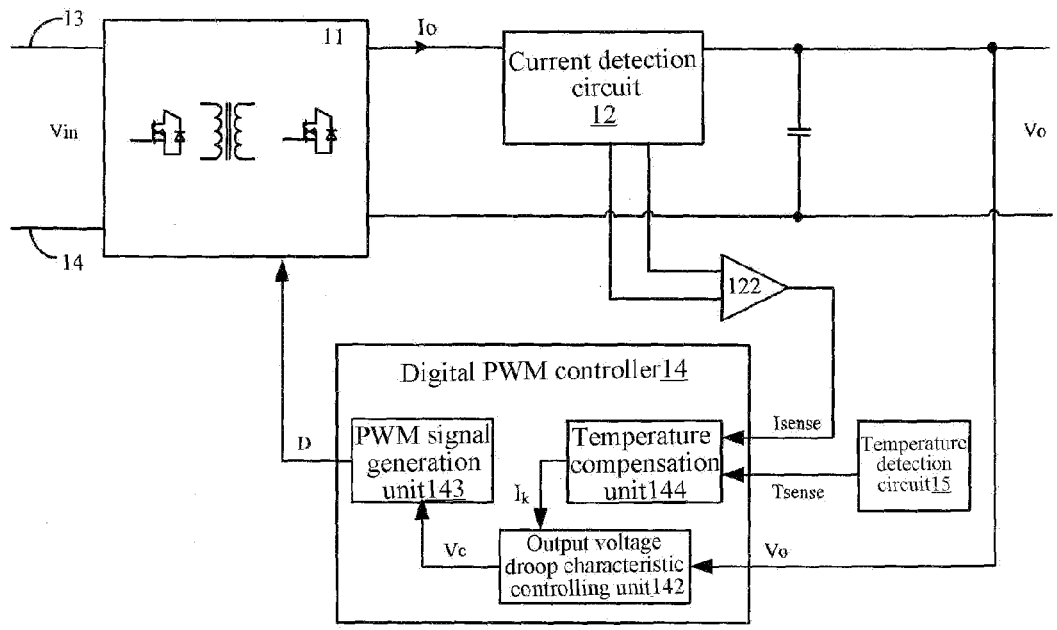
FIG. 9 is a schematic circuit block diagram of a DC-DC converter in a DC-DC converter system according to an exemplary embodiment of the present disclosure.

FIG. 9 is a schematic circuit block diagram of a DC-DC converter in a DC-DC converter system according to an exemplary embodiment of the present disclosure. The DC-DC converter in the DC-DC converter system includes a power conversion circuit 11, a current detection circuit 12, a temperature detection circuit 15 and a digital PWM controller 14. The power conversion circuit 11, the current detection circuit 12 and the temperature detection circuit 15 are described as above, and the descriptions thereof are not repeated herein.

The digital PWM controller 14 includes a temperature compensation unit 141, a PWM signal generation unit 143 and an output voltage droop characteristic controller 142. Since the power conversion circuit 11, the current detection circuit 12 and the temperature detection circuit 15 are described as above, the description thereof are not repeated herein.

The output voltage droop characteristic controller 142 is electrically coupled to the temperature compensation unit 141 and the PWM signal generation unit 143. The output voltage droop characteristic controller 142 generates a control signal Vc for controlling the output voltage droop characteristic on the basis of the corrected current detection signal $I_k$ and the output voltage Vo of the DC-DC converter.

Figure 10:
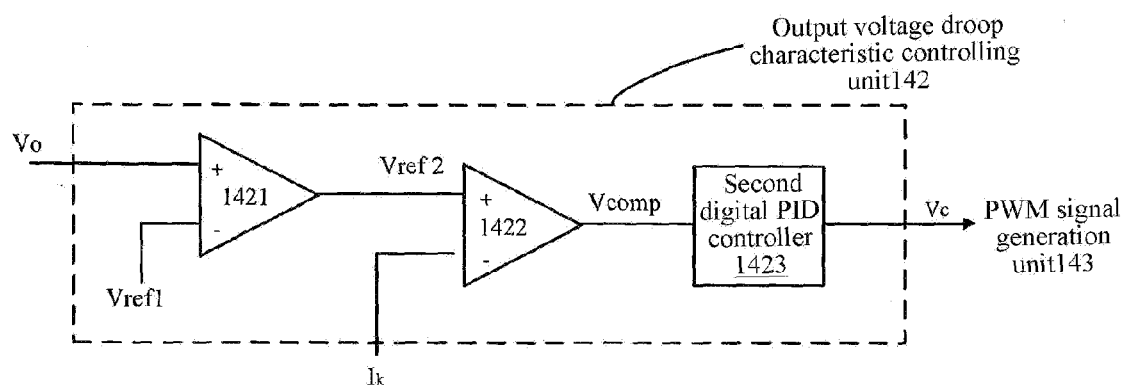
FIG. 10 is a schematic circuit diagram of an output voltage droop characteristic controller in a DC-DC converter system according to an exemplary embodiment of the present disclosure.

FIG. 10 is a schematic circuit diagram of an output voltage droop characteristic controller in a DC-DC converter system according to an exemplary embodiment of the present disclosure. As shown in FIG. 10, the output voltage droop characteristic controller 142 includes a first error amplifier 1421, a second error amplifier 1422 and a second digital PID controller 1423.

The first error amplifier 1421 receives and compares the output voltage Vo with a first voltage reference signal Vref1, and outputs a second voltage reference signal Vref2. The first voltage reference signal Vref1 may be predetermined by the firmware in the digital PWM controller 14.

The second error amplifier 1422 is coupled to an output terminal of the first error amplifier 1421, receives and compares the second voltage reference signal Vref2 with the corrected current detection signal $I_k$, and outputs a voltage comparison signal $V_{comp}$, wherein $V_{comp}=V_{ref2}-I_k$. When the output current $I_k$ becomes larger, $V_{comp}$ becomes smaller.

The second digital PID controller 1423 is coupled to an output terminal of the second error amplifier 1422 for receiving the voltage comparison signal $V_{comp}$ and outputting the control voltage Vc used for controlling the output voltage droop characteristic. The control voltage Vc reflects the variation conditions of $V_{comp}$, and controls the PWM generation unit 143 to generate a PWM driving signal D. The PWM driving signal D is sent as a feedback signal to the power conversion circuit 11 so as to adjust the magnitude of the output voltage Vo.

For example, when the output current $I_k$ becomes larger, $V_{comp}$ becomes smaller. Thus, the control module 14 may regulate the output voltage Vo of the DC-DC converter 1 to be decreased. On the contrary, if the output current $I_k$ becomes smaller, $V_{comp}$ becomes larger. The control module 14 may regulate the output voltage Vo of the DC-DC converter 1 to be increased.

In addition, the digital PWM controller 14 in the embodiment of the present disclosure includes the register, the firmware, the first digital PID controller 1413, the second digital PID controller 1423, the first error amplifier 1421 and the second error amplifier 1422. The digital temperature signal, the lookup table and the predetermined formula are stored in the register or firmware of the digital PWM controller 14.

Based on the above, since the current sharing control may be completely achieved by hardware in the embodiments of the present disclosure, the response speed is very quick, and thus the deficiency in the conventional digital control method may be overcome.

As present, the DC-DC converter system is widely applied due to its advantages of easy expansion, high reliability, flexible usage, convenient maintenance and the like. Moreover, the parallel architecture, i.e., the manner in which a plurality of DC-DC converters are connected in parallel, is widely adopted in the DC-DC converter system, and the parallel architecture has the advantages that it may facilitate the modularization of the power supply and the design of the standard system, and may achieve the redundancy design and improve the reliability of the system. However, the control parameters are different among respective modules, and the outputs of respective modules have the performance of voltage source; in this case, if there is no specific current sharing measure, the minor deviation of the output voltage will result in a great difference of the output current, and once a certain module is overloaded, the heat stress of one or more power devices will be too large, thereby reducing the stability of the system.

In order to improve the performance of the distributed power supply system, it is required to propose an efficient current sharing technique (or known as parallel current sharing technique). In order to make the output voltages of respective parallel DC-DC converter be equal, the output current of the DC-DC converter is detected or sampled by using the current detection circuit firstly in general, and then the current sharing control is performed on the obtained detection signal so as to achieve the current sharing of respective DC-DC converters.

Figure 11:
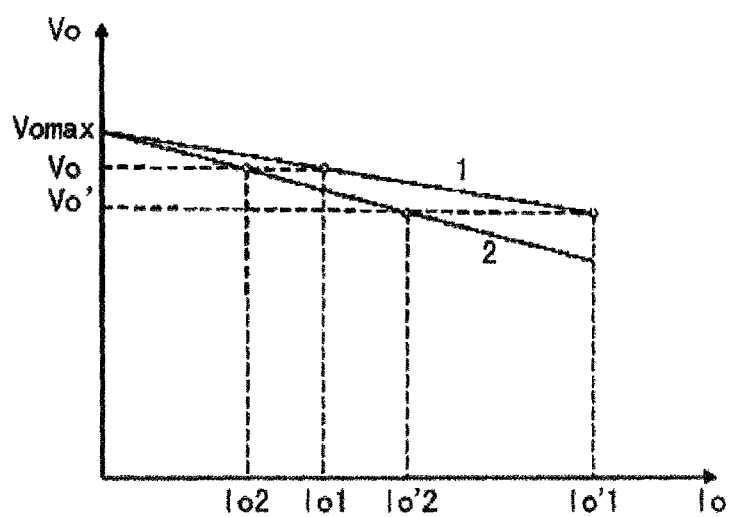
FIG. 11 is a graph of an output voltage droop characteristic of the converter system having a plurality of parallel DC-DC converters according to an exemplary embodiment of the present disclosure.

FIG. 11 is a graph of a droop characteristic of an output voltage of the converter system having a plurality of parallel DC-DC converters according to an exemplary embodiment of the present disclosure. Two oblique lines drooped to right respectively represent the droop characteristic of the output voltages of different DC-DC converters, i.e., the output voltages slightly descend as the increase of the output current. The slope is the same value for the product designs of the same model number, but the actual values of them are slightly different due to errors existing among respective products. When a plurality of DC-DC converters are used in parallel, the output voltage of them is always the same value Vo, therefore the current value Io1, Io2 of them are slightly different. The more accurate the droop characteristic of the two products is, the smaller the current error ΔIo due to the parallel usage is. By adopting the droop characteristic with high precise achieved by the above technique, the current error due to the parallel usage may be smaller than 5%.

In sum, the current detection circuit in the DC-DC converter proposed in the present disclosure has the advantages of no loss and no delay. Moreover, the DC-DC converter in the present disclosure also has the temperature compensation unit and the temperature detection circuit, and may perform temperature compensation on the current detection signal output from the current detection circuit according to the current temperature of the output inductor, so as to correct the current detection signal, thereby ensuring the precise and reliability of the current detection circuit of the DC-DC converter of the present disclosure.

The DC-DC converter system proposed in the present disclosure adopts the output voltage droop characteristic controller to achieve the current sharing among respective DC-DC converters in the DC-DC converter system, so as to guarantee the current stress and heat stress to be distributed uniformly among the parallel DC-DC converters.

The person skilled in the art should appreciate that the modifications and improvements made without departing from the scope and spirit of the present disclosure disclosed by the claims of the present disclosure fall within the protection scope of the claims in the present disclosure.

What is claimed is:

1. A DC-DC converter comprising: a power conversion circuit; and a current detection circuit configured to detect current flowing into the power conversion circuit or flowing out of the power conversion circuit, comprising: an inductor coupled to the power conversion circuit; a detection module comprising an induction winding and a capacitor which are electrically coupled in series, wherein the detection module and the inductor are coupled in parallel; and an output module coupled to two ends of the capacitor and configured to generate a current detection signal reflecting the current flowing into the power conversion circuit or flowing out of the power conversion circuit.

2. The DC-DC converter according to claim 1, wherein the output module is a differential amplifier.

3. The DC-DC converter according to claim 1, wherein the winding of the inductor and the induction winding are PCB windings.

4. The DC-DC converter according to claim 1, wherein the induction winding is winded on a magnetic core of the inductor.

5. The DC-DC converter according to claim 3, wherein the number of turns and a winding direction of the induction winding are the same with those of the winding of the inductor.

6. The DC-DC converter according to claim 3, wherein the induction winding and the winding of the inductor are located at the same layer of PCB.

7. The DC-DC converter according to claim 1, wherein the power conversion circuit is an isolated DC-DC conversion circuit.

8. The DC-DC converter according to claim 7, wherein the current detection circuit is disposed at a primary side of the power conversion circuit to detect the current flowing into the power conversion circuit.

9. The DC-DC converter according to claim 7, wherein the current detection circuit is disposed at a secondary side of the power conversion circuit to detect the current flowing out of the power conversion circuit.

10. The DC-DC converter according to claim 9 further comprising:
a temperature detection circuit configured to detect the temperature of the inductor and output a temperature detection signal; and
a digital PWM controller electrically coupled to the power conversion circuit, the current detection circuit and the temperature detection circuit, which is configured to receive the current detection signal, the temperature detection signal and an output voltage of the DC-DC converter, and configured to output a PWM driving signal so as to control the power conversion circuit.

11. The DC-DC converter according to claim 10, wherein the digital PWM controller further comprises:
a temperature compensation unit configured to receive the current detection signal and the temperature detection signal, and output a corrected current detection signal; and
a PWM signal generation unit coupled to the temperature compensation unit and configured to generate the PWM driving signal on the basis of the corrected current detection signal and the output voltage of the DC-DC converter.

12. The DC-DC converter according to claim 11, wherein the temperature compensation unit comprises an analog-to-digital (A/D) conversion unit, a calculation unit and a first digital PID controller, wherein
the A/D conversion unit is configured to convert the temperature detection signal into a digital temperature signal;
the calculation unit is configured to process the digital temperature signal so as to obtain a temperature compensation factor; and
the first digital PID controller is configured to receive the current detection signal, and to obtain the corrected current detection signal on the basis of the temperature compensation factor and the current detection signal.

13. The DC-DC converter according to claim 1, wherein the DC-DC converter further comprises:
a temperature detection circuit configured to detect the temperature of the inductor and output a temperature detection signal; and
a temperature compensation unit configured to receive the current detection signal and the temperature detection signal and output a corrected current detection signal.

14. A DC-DC converter system comprising: a plurality of parallel DC-DC converters, each DC-DC converter comprises: a power conversion circuit; and a current detection circuit configured to detect current flowing into the power conversion circuit or flowing out of the power conversion circuit, comprising: an inductor coupled to the power conversion circuit; a detection module comprising an induction winding and a capacitor which are electrically coupled in series, wherein the detection module and the inductor are coupled in parallel; and an output module coupled to two ends of the capacitor and configured to generate a current detection signal reflecting the current flowing into the power conversion circuit or flowing out of the power conversion circuit; and at least one non-isolated switch regulator electrically coupled to an output terminal of at least one of the DC-DC converters and configured to convert an output voltage of at least one of the DC-DC converters to one or more regulated voltage.

15. The DC-DC converter system according to claim 14, wherein in at least one of the DC-DC converters, the winding of the inductor and the induction winding are PCB windings.

16. The DC-DC converter system according to claim 14, wherein in at least one of the DC-DC converters, the number of turns and a winding direction of the induction winding are the same with those of the winding of the inductor.

17. The DC-DC converter system according to claim 14, wherein in at least one of the DC-DC converters, the induction winding and the winding of the inductor are located at the same layer of PCB.

18. The DC-DC converter system according to claim 14, wherein in at least one of the DC-DC converters, the induction winding and the winding of the inductor are located at adjacent two layers of PCB, and projections of the both are overlapped.

19. The DC-DC converter system according to claim 14, wherein in at least one of the DC-DC converters, the power conversion circuit is an isolated DC-DC conversion circuit.

20. The DC-DC converter system according to claim 19, wherein in at least one of the DC-DC converters, the current detection circuit is disposed at a primary side of the power conversion circuit to detect the current flowing into the power conversion circuit.

21. The DC-DC converter system according to claim 19, wherein in at least one of the DC-DC converters, the current detection circuit is disposed at a secondary side of the power conversion circuit to detect the current flowing out of the power conversion circuit.

22. The DC-DC converter system according to claim 21, wherein at least one of the DC-DC converters further comprises:
 a temperature detection circuit configured to detect a temperature of the inductor and output a temperature detection signal; and
 a digital PWM controller electrically coupled to the power conversion circuit, the current detection circuit and the temperature detection circuit, which is configured to receive the current detection signal, the temperature detection signal and an output voltage of at least one of the DC-DC converters, and configured to output a PWM driving signal so as to control the power conversion circuit.

23. The DC-DC converter system according to claim 22, wherein the digital PWM controller further comprises:
 a temperature compensation unit configured to receive the current detection signal and the temperature detection signal and output a corrected current detection signal; and
 a PWM signal generation unit coupled to the temperature compensation unit and configured to generate the PWM driving signal on the basis of the corrected current detection signal and the output voltage of at least one of the DC-DC converters.

24. The DC-DC converter system according to claim 23, wherein the temperature compensation unit comprises an analog-to-digital (A/D) conversion unit, a calculation unit and a first digital PID controller, wherein
 the A/D conversion unit is configured to convert the temperature detection signal into a digital temperature signal;
 the calculation unit is configured to process the digital temperature signal so as to obtain a temperature compensation factor; and
 the first digital PID controller is configured to receive the current detection signal, and to obtain the corrected current detection signal on the basis of the temperature compensation factor and the current detection signal.

25. The DC-DC converter system according to claim 23, wherein the digital PWM controller further comprises:
 an output voltage droop characteristic controller configured to generate a control signal on the basis of the corrected current detection signal and the output voltage of at least one of the DC-DC converters so as to control the droop characteristic of the output voltage.

26. The DC-DC converter system according to claim 25, wherein the output voltage droop characteristic controller unit comprises a first comparator, a second comparator and a second digital PID controller,
 wherein the first comparator is configured to receive and compare the output voltage to a first voltage reference signal, and output a second voltage reference signal;
 the second comparator is coupled to an output terminal of the first comparator and configured to receive and compare the second voltage reference signal to the corrected current detection signal, and output a voltage comparison signal; and
 the second digital PID controller is coupled to an output terminal of the second comparator and configured to receive the voltage comparison signal and output the control signal for controlling the droop characteristic of the output voltage.

27. The DC-DC converter system according to claim 25, wherein at least one of the DC-DC converters has a droop characteristic with a current error smaller than 5%.

* * * * *